Patented Feb. 17, 1925.

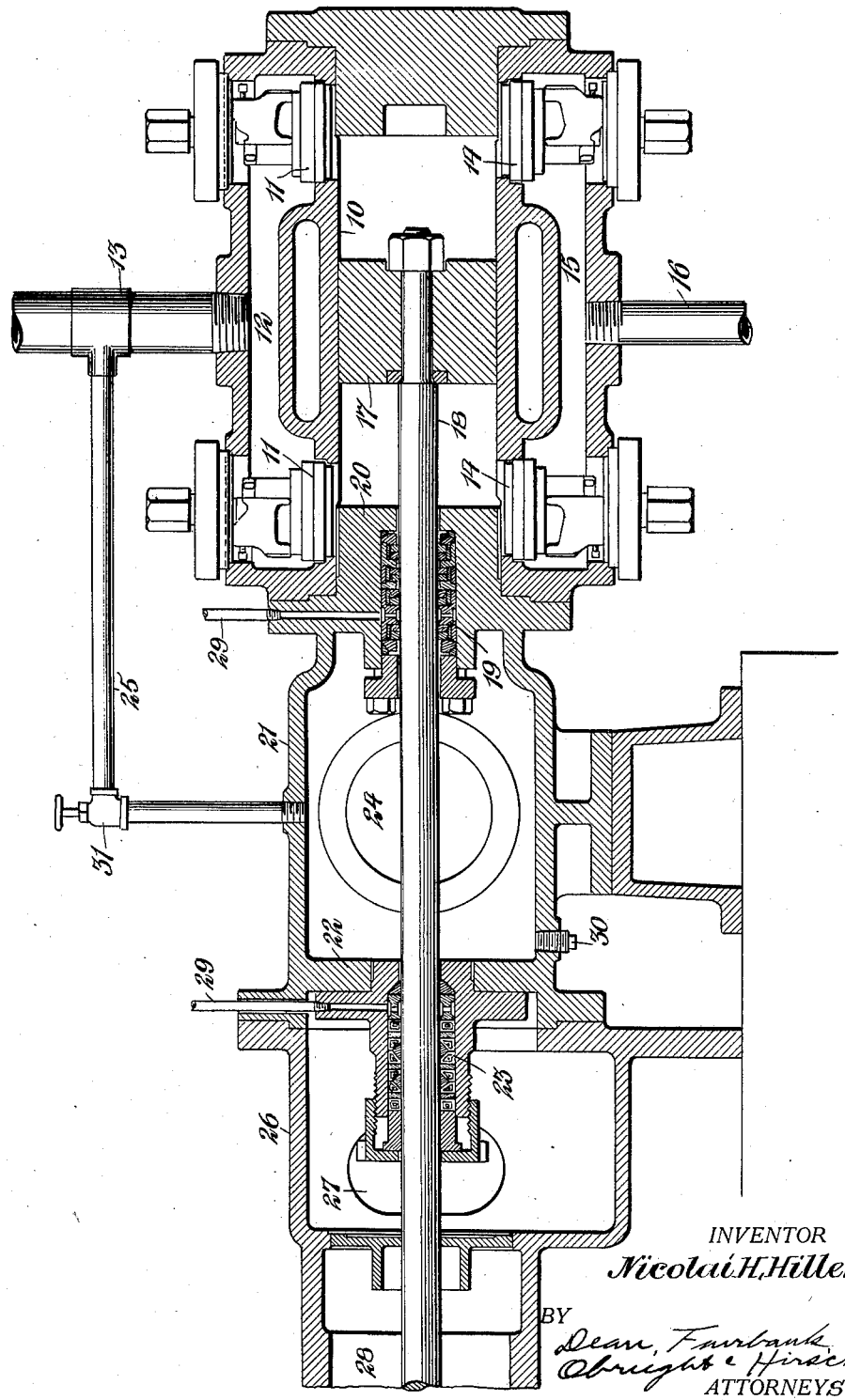

1,526,909

UNITED STATES PATENT OFFICE.

NICOLAI H. HILLER, OF CARBONDALE, PENNSYLVANIA.

COMPRESSOR.

Application filed May 14, 1924. Serial No. 713,134.

*To all whom it may concern:*

Be it known that I, NICOLAI H. HILLER, a citizen of the United States, and resident of Carbondale, in the county of Lackawanna and State of Pennsylvania, have invented certain new and useful Improvements in Compressors, of which the following is a specification.

In refrigerating systems employing liquifiable gases such as ammonia, it is very important that leaks to or from the system be prevented. Air leaking into the system where sub-atmospheric pressure is maintained, interferes with efficient operation and gas escaping from the system where the pressure is above that of the atmosphere is objectionable not only because of the loss of gas but because of the disagreeable or dangerous action of the gas.

In systems of the compression type the point at which leakage is most liable to occur is at the stuffing box of the compressor piston rod. The pressure within the cylinder adjacent to the stuffing box is alternately above and below that of the atmosphere and the piston rod is continously moving back and forth through the stuffing box. The most effective type of packing in the stuffing box will serve to prevent any substantial leakage so long as conditions remain uniform, but it often happens that the piston rod is subjected to changes of temperature through a comparatively wide range. During the compression stroke the temperature of the gas is raised and thereby warms the piston rod while it often happens that liquid ammonia comes over into the compressor with the gas and chills the piston rod. If the stuffing box be of such a character as to maintain efficient and free operation of the piston rod when the latter is at a higher temperature, it is generally too loose and permits leakage when chilled and contracted by the action of liquid ammonia.

My invention relates particularly to the construction of the stuffing box of the compressor, and the main object of the invention is to effectively prevent leakage to or from the system at the stuffing box during the varying conditions of use.

As the main feature of my invention I provide a pair of stuffing boxes which are so spaced that no portion of the piston rod which has been subjected to the direct chilling action of the liquid or gas in the cylinder can reach or pass into the second stuffing box, and I connect the space or chamber between these stuffing boxes with the system so as to return to the system any gas or liquid which may leak past the first stuffing box. Preferably this chamber between the two stuffing boxes is subjected to sub-atmospheric pressure by direct connection to the suction line of the system.

In the accompanying drawing I have illustrated one embodiment of my invention, the drawing showing a central longitudinal section. The form illustrated embodies many details of construction which form no portion of my present invention, as will be apparent from a consideration of the scope of the appended claims.

In the construction illustrated there is provided a cylinder 10 having inlet valves 11 at opposite ends and controlling the admission from a passage 12 to which leads the suction or gas delivery pipe 13. The cylinder also has outlet valves 14 at opposite ends for controlling the delivery of the compressed gas to a passage 15 from which leads the high pressure delivery pipe 16. Within the cylinder is the piston 17 which is secured to the piston rod 18. The latter extends through the usual stuffing box 19 in the cylinder head 20.

As the important feature of my invention I provide a chamber 21 which is secured to or integral with the cylinder head 20, and is provided with an outer end wall 22 substantially parallel to the cylinder head and spaced therefrom and provided with a second stuffing box 23 which may be similar in character to the stuffing box 19. The chamber may have a removable head, side wall or cover 24, normally sealed but which may be removed if desired to adjust the gland, packing or gaskets of the stuffing box 19.

The distance between the two stuffing boxes 19 and 23 is such that none of that portion of the piston rod which moves back and forth through the stuffing box 23 will move into and out of the cylinder. Preferably the distance between the two stuffing boxes is substantially equal to the length of the stroke of the piston, whereby no portion of the piston rod which moves back and forth in one stuffing box will enter the other stuffing box. As a result the portion of the piston rod which moves back and forth in the stuffing box 23 will never be subjected to the chilling or heating effect of direct contact with gas in the cylinder. The portion of the piston rod which moves back and forth in the stuffing box 19 may expand or contract and cause leakage past this stuffing box, but there will be no appreciable heating or cooling and corresponding expansion and contraction of the portion of the piston rod which moves back and forth in the stuffing box 23. The stuffing box 23 may thus be maintained gas tight, and means provided for taking care of any leakage which occurs past the stuffing box 19. To take care of this leakage the chamber 21 is maintained at sub-atmospheric pressure by means of a conduit 25 leading from this chamber to the suction or inlet side of the system. Preferably it leads directly to the suction pipe 13. Thus during a suction stroke when there is a partial vacuum in the cylinder at the end opposite to the stuffing box 19, no air can leak through into the cylinder if the packing be loose, and during the return stroke of the piston any gas which escapes past the stuffing box 19 will enter the chamber 21 and be returned to the compressor at the suction side.

The piston rod at its outer end may be connected to any suitable source of power. In the form illustrated the stuffing box 23 is in a chamber 26 having an opening 27 through which the gland may be adjusted, and beyond this chamber is a guideway 28 for a crosshead not shown. The stuffing boxes may be of any suitable type, and are preferably provided with oil supply conduits 29 for lubrication and for aiding in effecting gas-tight seals. The chamber 21 may have a drainage outlet 30 which is normally closed gas-tight, but which may be opened if desired to drain lubricating oil or liquid which may accumulate in the bottom of the chamber. The pipe 25 may have a valve 31 for closing it during such drainage. Although it is preferable to maintain a sub-atmospheric pressure in the chamber 21, I may connect the pipe 25 to a part of the system in which a pressure above that of the atmosphere is maintained. For instance, in a multiple stage compressor the pipe 25 may lead to the intercooler between the stages.

Having thus described my invention, what I claim as new and desire to secure by Letters Patent is:—

1. In a gas compressor, the combination with the cylinder, piston and piston rod, of a chamber through which said piston rod passes, a stuffing box between said cylinder and said chamber, a stuffing box between said chamber and the outside atmosphere, said stuffing boxes being independently adjustable, and means for withdrawing from said chamber gas leaking thereinto past said first mentioned stuffing box, and maintaining in said chamber a gas pressure below that of the delivery pressure of the compressor.

2. A compressor having in combination with the cylinder, piston and piston rod thereof a pair of stuffing boxes for the piston rod spaced apart to a distance at least equal to the length of the stroke of the piston, a chamber between said stuffing boxes, and means for connecting said chamber with one of the gas conduits of the compressor.

3. A compressor having a cylinder, a piston, a piston rod, a cylinder head having a stuffing box, a chamber encircling a section of the piston rod beyond said stuffing box, a second stuffing box in the outer wall of said chamber, the second stuffing box being spaced from the cylinder head to a distance at least equal to the length of the stroke of the piston, gas supply and delivery conduits for said compressor, and a conduit connecting said chamber with one of said first mentioned conduits.

4. A compressor having a chamber encircling the piston rod outside of the cylinder, and having a stuffing box in its outer wall, the inner surface of said outer wall being spaced from the inner surface of the adjacent cylinder head to a distance at least equal to the length of the stroke of the piston, whereby no portion of the piston rod which enters the cylinder can enter said stuffing box, and means for connecting said chamber to the gas system of the compressor.

Signed at Fell Township, in the county of Lackawanna and State of Pennsylvania, this 12th day of May, A. D. 1924.

NICOLAI H. HILLER.